US007793691B2

(12) United States Patent
McAnally et al.

(10) Patent No.: US 7,793,691 B2
(45) Date of Patent: Sep. 14, 2010

(54) THERMAL INSULATING DEVICE FOR CONCRETE MIXING TRUCKS

(75) Inventors: William Michael McAnally, Catoosa, OK (US); James William Kuykendall, Tulsa, OK (US)

(73) Assignee: Thermadrum, LLC, Catoosa, OK (US)

( * ) Notice: Subject to any disclaimer, the term of this patent is extended or adjusted under 35 U.S.C. 154(b) by 931 days.

(21) Appl. No.: 11/591,862

(22) Filed: Nov. 2, 2006

(65) Prior Publication Data

US 2007/0217281 A1 Sep. 20, 2007

Related U.S. Application Data

(60) Provisional application No. 60/732,852, filed on Nov. 2, 2005.

(51) Int. Cl.
*B60P 3/16* (2006.01)
*B28C 5/00* (2006.01)
*B28C 5/42* (2006.01)

(52) U.S. Cl. ........................ 150/166; 150/901; 366/347

(58) Field of Classification Search ................. 206/335; 220/694.1; 150/154, 166, 901; 296/100.04, 296/100.11, 100.08; 366/347, 349
See application file for complete search history.

(56) References Cited

U.S. PATENT DOCUMENTS 519,137 A * 5/1894 Scott, Jr. .................. 220/694.1
2,705,208 A * 3/1955 Schweikert .................. 60/685
5,511,846 A * 4/1996 Fuller ......................... 294/149
5,549,956 A 8/1996 Handwerker
5,657,594 A 8/1997 Morita et al.
D393,572 S 4/1998 Melk
5,780,367 A 7/1998 Handwerker
5,809,998 A 9/1998 Hughes et al.
5,855,978 A 1/1999 Handwerker
6,196,287 B1 3/2001 Haberkorn
6,264,361 B1 7/2001 Kelley
6,328,083 B1 * 12/2001 Esterson et al. ............. 150/154
7,117,908 B1 * 10/2006 Coron ........................ 150/154
7,316,435 B2 * 1/2008 Leighton .................... 294/152

* cited by examiner

*Primary Examiner*—Tony G Soohoo
(74) *Attorney, Agent, or Firm*—John G. Fischer, Esq.; Storm LLP

(57) ABSTRACT

An insulator for a drum of a concrete truck is provided. Because temperature is a factor in the time in which concrete cures, thermal conditions during transport are of paramount concern. There have been efforts to alleviate this problem by providing insulating blankets that control temperature better. However, until now, a durable system that effectively insulates concrete while in transport has not been available. Furthermore, construction of an insulating system large enough to cover a concrete mixer gives rise to numerous fabrication difficulties. With the introduction of a polyethylene foam interposed between truck tarp material, a convenient system that is easily coupled and decoupled from a truck is available that is both durable and cost effective.

9 Claims, 12 Drawing Sheets

THERMAL INSULATING DEVICE FOR CONCRETE MIXING TRUCKS

CROSS-REFERENCE TO RELATED APPLICATIONS

This application claims priority to U.S. Provisional Application 60/732,852 filed Nov. 2, 2005.

TECHNICAL FIELD OF INVENTION

The invention relates generally to thermal insulation techniques and, more particularly, to a thermal insulating device for concrete mixing trucks.

BACKGROUND OF THE INVENTION

Concrete mixing trucks are an integral component of construction. Concrete mixing trucks are available in a variety of sizes, and many can carry 10 cubic yards or more of concrete. They are capable of delivering concrete to job sites many miles away. However, the deliverance range is limited by numerous physical variables associated with the perishability of the contents, namely, the concrete.

Concrete is a composite building material. It is unique in that it can be delivered to the construction site in a plastic state and formed to a desirable shape. The most common type of concrete is Portland cement concrete. The two major components of Portland cement concrete are cement paste and inert materials. The inert materials are normally comprised of fine (generally less than 6.4 mm/0.025 in.) and coarse (generally greater than 6.4 mm/0.25 in.) mineral aggregates. Sand is the most common fine aggregate. Gravel, crushed stone, and slag are the most common coarse aggregates.

Other components of concrete include Portland cement, water, and a small amount of air. Portland cement is produced by mixing ground limestone, clay or shale, sand and iron ore. The mixture is heated in a rotary cement kiln. The heating process causes the materials to break down and recombine into new compounds that react with water in a crystallization process called hydration.

Water is the essential component that chemically reacts with the cement, in the hydration reaction. When water is supplied to the concrete, it also provides the initial plasticity necessary to allow the concrete to be poured into forms.

The hydration and setting of concrete is known as curing. Concrete cures in several stages. This allows it to be transported in concrete mixing trucks to construction sites and to be delivered in a condition ready for pouring. Once the concrete is mixed with water, the cement begins a slow cure and the mix hardens. Depending on the exact mixture and additives that may be present, within a day and a half, most of the hydration process is complete, but the cement will continue to cure as long as water and unhydrated compounds are present. The entire process can actually take years.

While the final hardening of concrete can take years, concrete begins to harden soon after mixing. Depending upon the amount of water used, the exact composition of the concrete and ambient weather conditions, concrete will lose its plasticity within a few hours of being mixed, making it unworkable within job site forms.

Workability is the ability of a fresh (plastic) concrete mix to fill the form/mold properly with the desired work (force or vibration) without reducing the concrete's strength. Workability depends on water content, additives, aggregate (shape and size distribution) and age (level of hydration). The level of hydration is very susceptible to environmental factors. In particular, moisture and temperature are critical variables in the curing of concrete.

When the concrete mixing truck arrives at the job site, workability is normally tested by slump measurement. Concrete slump is a simplistic measure of fresh (plastic) concrete's workability.

Concrete transport trucks are designed to transport ready-mix concrete from the concrete plant to the construction site. Rotating drums are employed to prevent premature setting of the concrete, proper mixing of the cement, aggregate, and water, and to provide a mechanism for removing the concrete from the drum. The interior of the drum on a cement truck is fitted with a spiral blade. In one rotational direction, the cement is pushed deeper into the drum while being mixed. This is the direction the drum is rotated while the concrete is being transported to the building site.

In properly mixed concrete, the cementing medium of concrete and water surround the aggregate particles, and as the cement paste hardens, it binds the aggregate into a solid mass. To insure proper mixing, standards have been developed pertaining to the rotation of concrete mixing drums. For example, drums are typically rotated at 17 revolutions per minute (rpm) for approximately 5 minutes (approximately 70 rotations) before leaving the concrete plant. While on the road, the drum will be rotated at approximately 2.5 rpm for the duration of the trip. This further mixes the contents and prevents early hardening of the concrete.

When the concrete transport truck reaches its destination, the rotation of the drum is reversed. When the drum is rotated in the opposite direction, the Archimedes screw-type arrangement forces the concrete out of the drum, and optionally onto slides to guide the viscous concrete, or to a concrete pumping unit.

Concrete must be poured into its final form while in a plastic state, before hardening occurs. If allowed to cure excessively, the concrete will lack adequate workability to be poured into the forms. If allowed to harden, the concrete will be extremely difficult to remove from the interior and exterior surfaces of the concrete mixing truck. Typically, a caustic compound, such as a strong acid, must be used to clean the concrete trucks.

One of the most determinative factors in preserving the workability of concrete in a plastic state prior to pouring is temperature. Depending on the climatic conditions of the region and the season, the cure rate for the concrete will vary dramatically. Additionally, the act of transporting the concrete exposes the concrete mixture to substantial heat transfer mechanisms acting on the concrete mixing truck.

As examples of the heat transfer, conductive heat transfer occurs as a result of the direct contact between the concrete and the interior wall of the drum and the spiral mixing blade. Convective heat transfer occurs between the drum and ambient air as the concrete transport truck travels down the road at freeway speed. Convective heat transfer may be increased by engagement of seasonal winds. Radiant heating of the drum occurs when the summer sun shines on the rotating drum.

In addition to normal influx or loss of heat resulting from weather conditions, concrete curing is an exothermic reaction. Depending on the specific mix of concrete, the heat of reaction can contribute significantly to thermal problems. To a lesser degree, frictional heating occurs on the interior of the drum as the concrete is mixed against the spiral blade on the interior of the drum.

The heat transfer rate is accelerated by the need to rotate the drum, exposing the mixing concrete across the large interior surface of the rotating drum. These heat transfer rates can be as high as 12 BTU/hr-ft2° F. or greater.

As a result, during extended transportation to a construction site, the temperature of the concrete during summer months can accelerate the curing rate such that the concrete is unworkable and/or unusable by the time the concrete mixing truck reaches the construction site. Similarly, the temperature of the concrete during winter months can decelerate the curing rate such that the concrete is unworkable, and/or unprepared for pouring by the time the concrete mixing truck reaches the construction site.

Thermal variations in transported concrete thus add significantly to construction costs, risks, and waste. Delays in construction are a common result. Over the years, numerous steps have been taken by contractors to compensate for the problems associated with climatic temperature variations and heat transfer associated with the transport of viscous concrete. Each of these compensating responses has limitations and disadvantages.

Chemical additives called admixtures are often used to accelerate or retard the hydration rate of the concrete in response to climatic conditions. In particular, a set-retarding admixture may be used to modify setting time in hot weather. An accelerator admixture may be used to modify setting time in cold weather. Plasticizers can also be employed to increase the workability of the concrete. However, the use of admixtures is costly and adds complexity to the process mixing and management of the concrete. Additionally, certain admixtures can undesirably alter the performance characteristics of the finished concrete product.

In addition to the use of admixtures, additional measures are taken when mixing concrete during seasonal temperature extremes. For example, during winter months, preheated water (approximately 180° F.) may be mixed with the concrete in an effort to normalize the temperature of the concrete mixture and accelerate hydration. During summer months, chilled water (near 32° F.) may be mixed with the concrete to normalize the temperature of the concrete mixture and retard hydration. However, utilizing preheated water or chilled water increases the production costs of the concrete. Also, even when steps are taken to manage the initial temperature of the components of the concrete, the mixture within the drum of the concrete transport truck remains subject to rapid heat transfer through the drum resulting from exposure to the ambient weather conditions.

Some other solutions posed are thermal insulation of the concrete drum. In particular, U.S. Pat. No. 6,264,361 to Kelley ("Kelley"), which is hereby incorporated by reference for all purposes, employs a cover for a drum of a concrete truck. Kelley utilizes a pair of thermal blankets over a foam rubber insulation layer to cover the entire drum, using a pair of fasteners to secure the blanket over the drum. Kelley's design, however, can be cumbersome to employ because the disclosed configuration cannot be efficiently manufactured or installed.

Another disadvantage is that the zippers or other fasteners are employed along curved seams. The disclosed fasteners are difficult to secure and may not be suitable for a variety of drum configurations. Another disadvantage is that the zippers or other fasteners are exposed, presenting a safety hazard as the drum rotates. Another disadvantage is that exposure of the zippers or other fasteners to the elements, including concrete, renders them inoperable.

Moreover, Kelley does not consider a number of the existing physical constraints, nor does it provide an optimized solution to several design variables. Considerations such as cost, construction, insulating factor, safety, retention, surface adhesion to concrete, durability, weight, clearances, seasonal assembly and removal, and wind resistance must be taken into account. These considerations, therefore, create a need for an optimized design for an insulating system for a concrete mixing truck.

Additionally, there are other difficulties in manufacturing blankets for concrete trucks, namely difficulty in sewing due to the size. The materials that comprise the concrete truck blankets are oftentimes heavy and cumbersome as well as large in size. Because of these factors, sewing these large pieces of material is extremely difficult, and the inaccuracy of the final product decreases safety and utility. Still another disadvantage is that manufacturing an insulating system as disclosed by Kelley results in the generation of substantial material waste.

Therefore, there is a need for a method and/or apparatus that addresses at least some of the problems associated with conventional insulating blankets.

SUMMARY OF THE INVENTION

A primary advantage of the present invention is that it provides an insulation system that can be manufactured using commercial sewing technology. Another advantage of the present invention is that it provides an insulation system that can be accurately manufactured, so that the system fits tightly on the drum, adding safety and utility. Another advantage of the present invention is that it provides an insulating system that can be manufactured without excessive waste of material. Another advantage of the present invention is that it provides an insulating system that resists adhesion to concrete, and is readily washable.

Another advantage of the present invention is that it utilizes a material that provides a thermally efficient insulating system. Another advantage of the present invention is that it provides an insulation system that can be readily installed and removed from the drum. Another advantage of the present invention is that it provides an insulating system that is durable. Another advantage of the present invention is that it provides a protective covering for the fastening system.

In a preferred embodiment of the present invention, a concrete truck drum insulating system is provided. The concrete truck drum insulator comprises an external layer, an internal layer, and an insulation layer interposed between the internal and external layers. The insulation layer includes a low-density, closed cell, polyolefin foam.

In another preferred embodiment, a longitudinal seam substantially coplanar with the azimuthal axis of the concrete drum is provided. The seam has a first edge and complementary second edge. A plurality of connectable fasteners is aligned along the first and second edges.

In a more preferred embodiment, straps are attached to the first edge, and strap receptacles are attached to the second seam to form the connectable fasteners. In another preferred embodiment, the strap receptacles are D-rings attached to the second edge. In a more preferred embodiment, the D-rings are made of a stainless steel.

In an optional embodiment, a longitudinal flap is attached to the external layer. A flap attachment is provided for securing the flap over the seam and fasteners when the fasteners of the first edge are connected to the fasteners of the second edge. In a more preferred embodiment, the flap attachment is a hook and loop system disposed between the flap and the external layer below the second edge.

In a preferred embodiment of the present invention, the external and internal layers are comprised of a vinyl chloride coated woven polyester, and the insulation layer is comprised of a low-density closed-cell polyethylene foam. In another preferred embodiment of the present invention, the weight of the external layer is greater than the weight of the internal layer.

In another preferred embodiment of the present invention, a concrete truck drum insulating system is provided having a material layer for covering the drum comprised of a plurality of sections, each section being comprised of a plurality of complementary panels. A common longitudinal seam is formed along adjacent edges of panels in each section. In another preferred embodiment, each section is comprised of three complementary panels. In an alternative embodiment, each section is comprised of four complementary panels.

In the preferred embodiment, the sections include frustoconical sections comprised of a plurality of complementary frustoconical panels. Each frustoconical panel includes a large arc, a small arc, and a pair of linear edges angularly disposed between the large and small arcs. The large arcs of the frustoconical panels of at least one frustoconical section are connected to the small arcs of a frustoconical panel of an adjacent frustoconical section.

In an optional embodiment, the material layer also includes a cylindrical section comprised of rectangular panels. The rectangular panels have a pair of radial widths, and a pair of linear edges. In this embodiment, the cylindrical panel is located between frustoconical panels, having each radial width connected to the long arc of a frustoconical panel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

In the following description, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
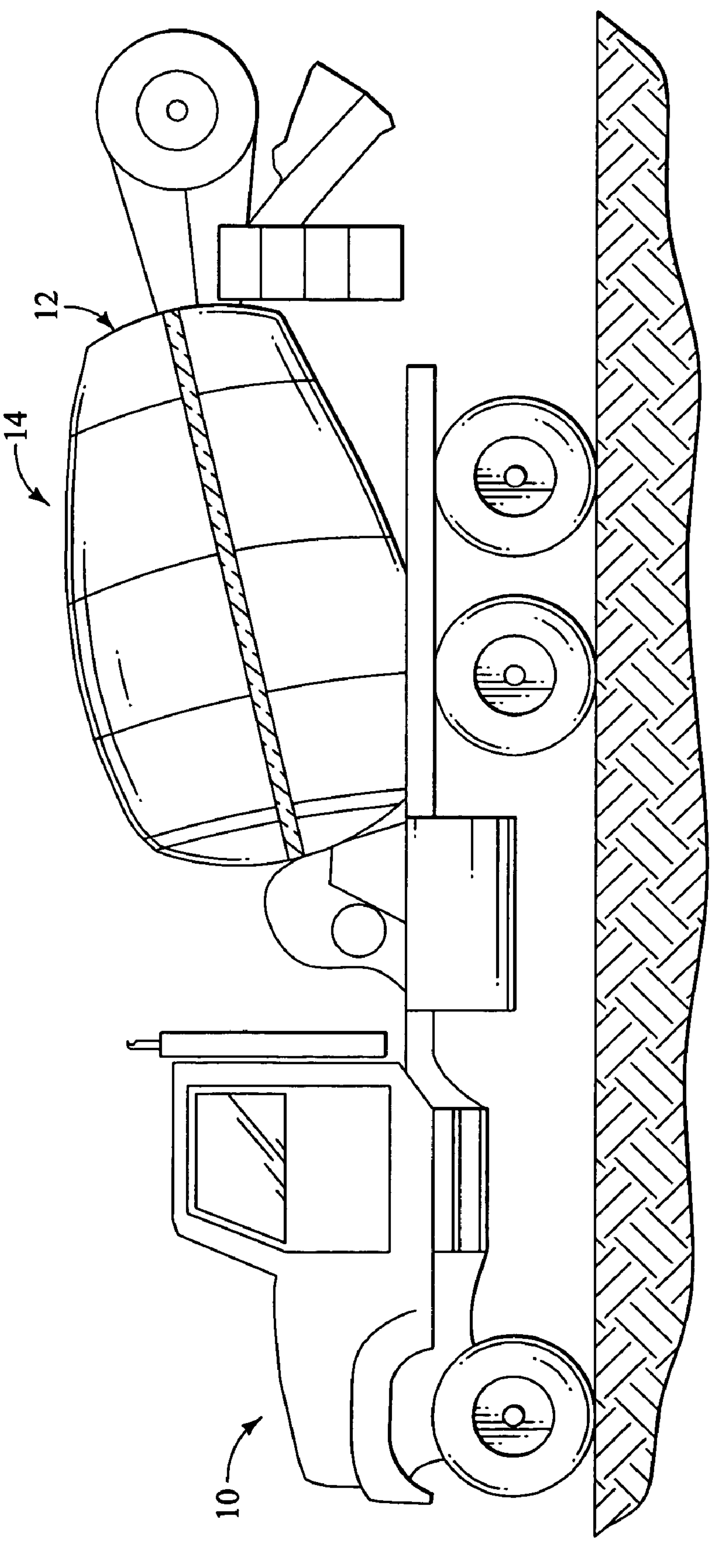
FIG. 1 is a side view of a concrete truck employing an insulator in accordance with a preferred embodiment of the present invention.

Referring to FIG. 1 of the drawings, the reference numeral 10 generally designates a concrete truck. Concrete truck 10 has a drum 12. An insulator 14 is adapted for secure attachment over drum 12.

Figure 2:
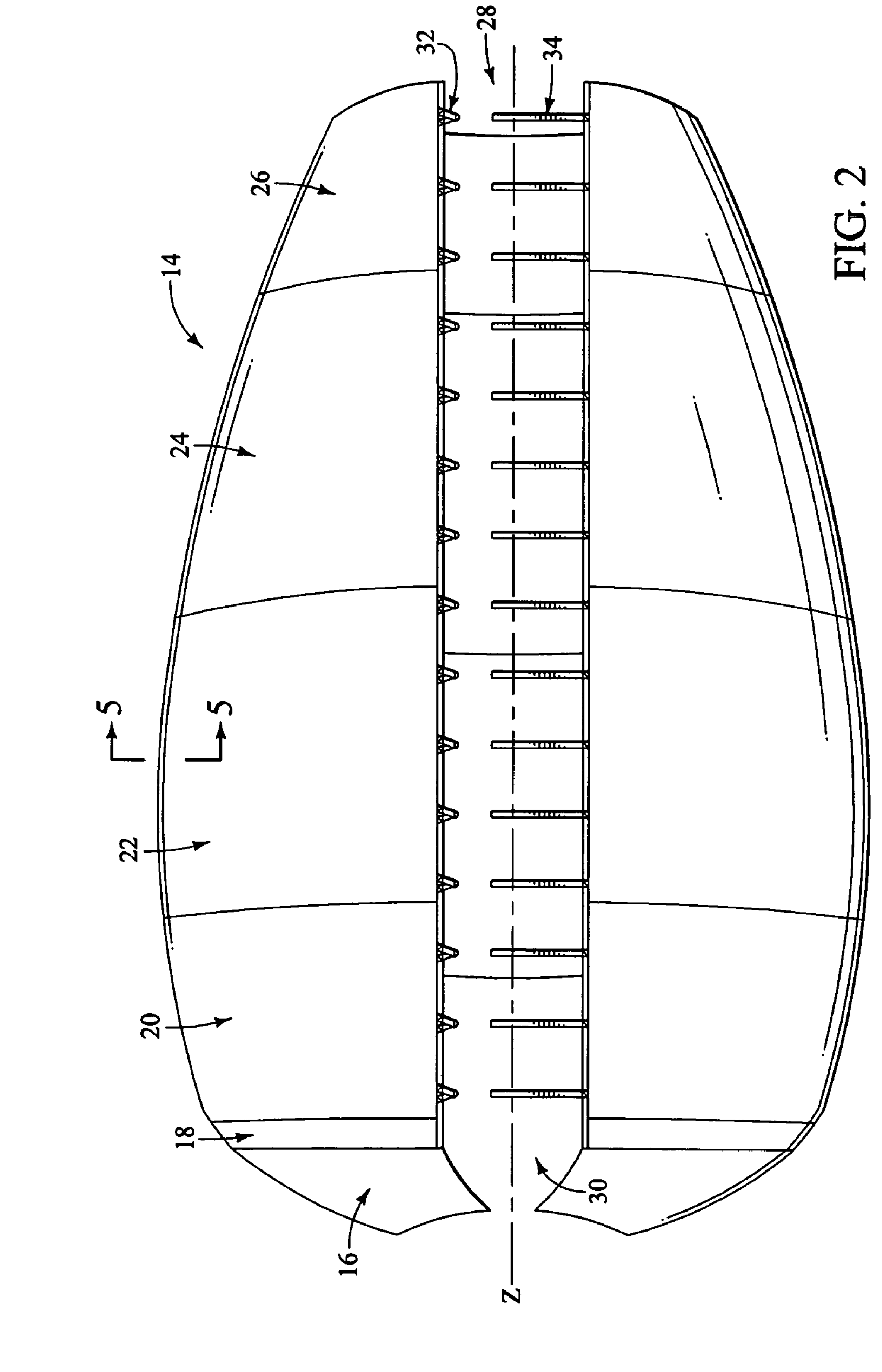
FIG. 2 is a top view illustrating the outside of the insulator in accordance with a preferred embodiment of the present invention.
Figure 3:
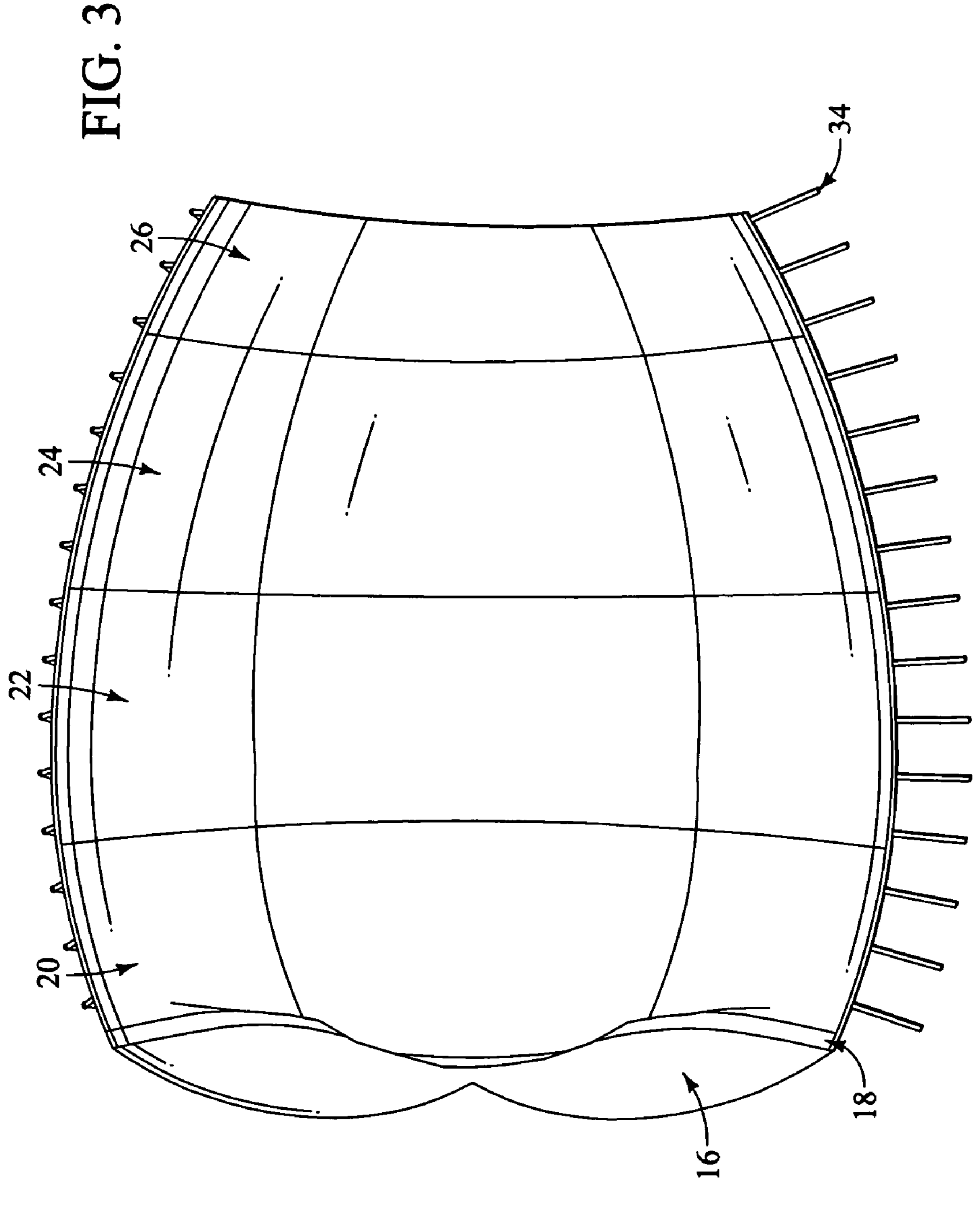
FIG. 3 is a top view illustrating the inside of the insulator in accordance with an embodiment of the present invention.

As can best be seen in FIGS. 2 and 3, insulator 14 is a uniform insulating blanket having a front section 16, an intermediate section 18, and a plurality of body sections 20, 22, 24, and 26. A common longitudinal seam 28 traverses the length of insulator 14 terminating at opening 30 at front section 16. A plurality of connectable fasteners 32 and 34 are located along the length of seam 28.

In the preferred embodiment, connectable fasteners 32 and 34 are strap connectors 32 and straps 34. Strap connectors 32 and straps 34 can be coupled to one another to secure insulator 14 over drum 12. By this method, seam 28 allows insulator 14 to be securely and easily installed and removed.

Additionally, a longitudinal flap 52 and flap attachment 54 are located on opposite sides of seam 28. In the preferred embodiment, longitudinal flap 52 and flap attachment 54 are secured to one another through a hook and loop system, thus providing a protective cover over connectable fasteners 32 and 34.

Referring to FIG. 2, in accordance with the preferred embodiment, and as further illustrated in FIGS. 4-9, each of sections 16, 18, 20, 22, 24, and 26 are comprised of a plurality of complementary panels 116, 118, 120, 122, 124, and 126, respectively. In a preferred embodiment illustrated, each section is comprised of four complementary panels. In another preferred embodiment (not shown), each section is comprised of three complementary panels.

Figure 4:
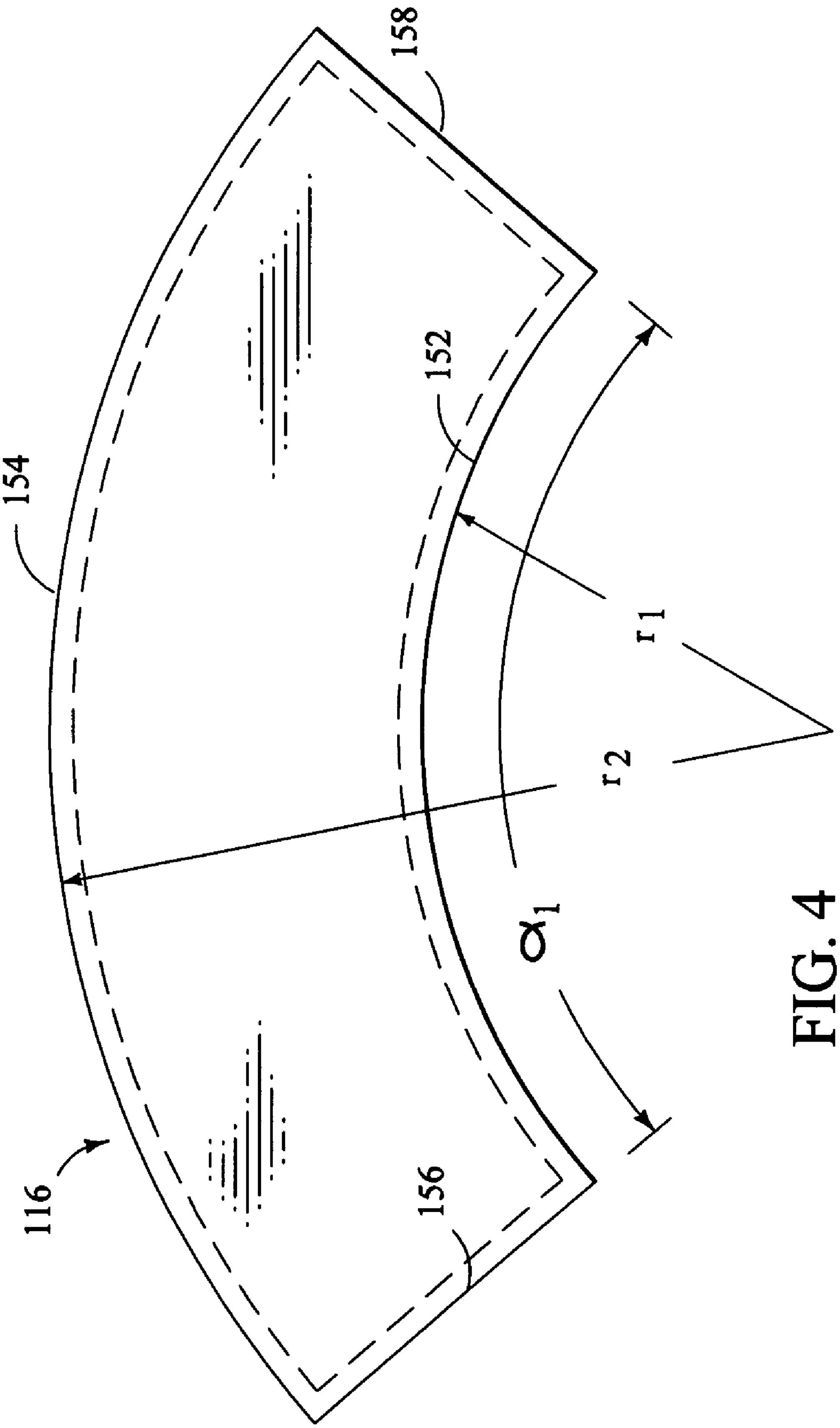
FIGS. 4-9 are top views of panels used to form sections.
Figure 5:
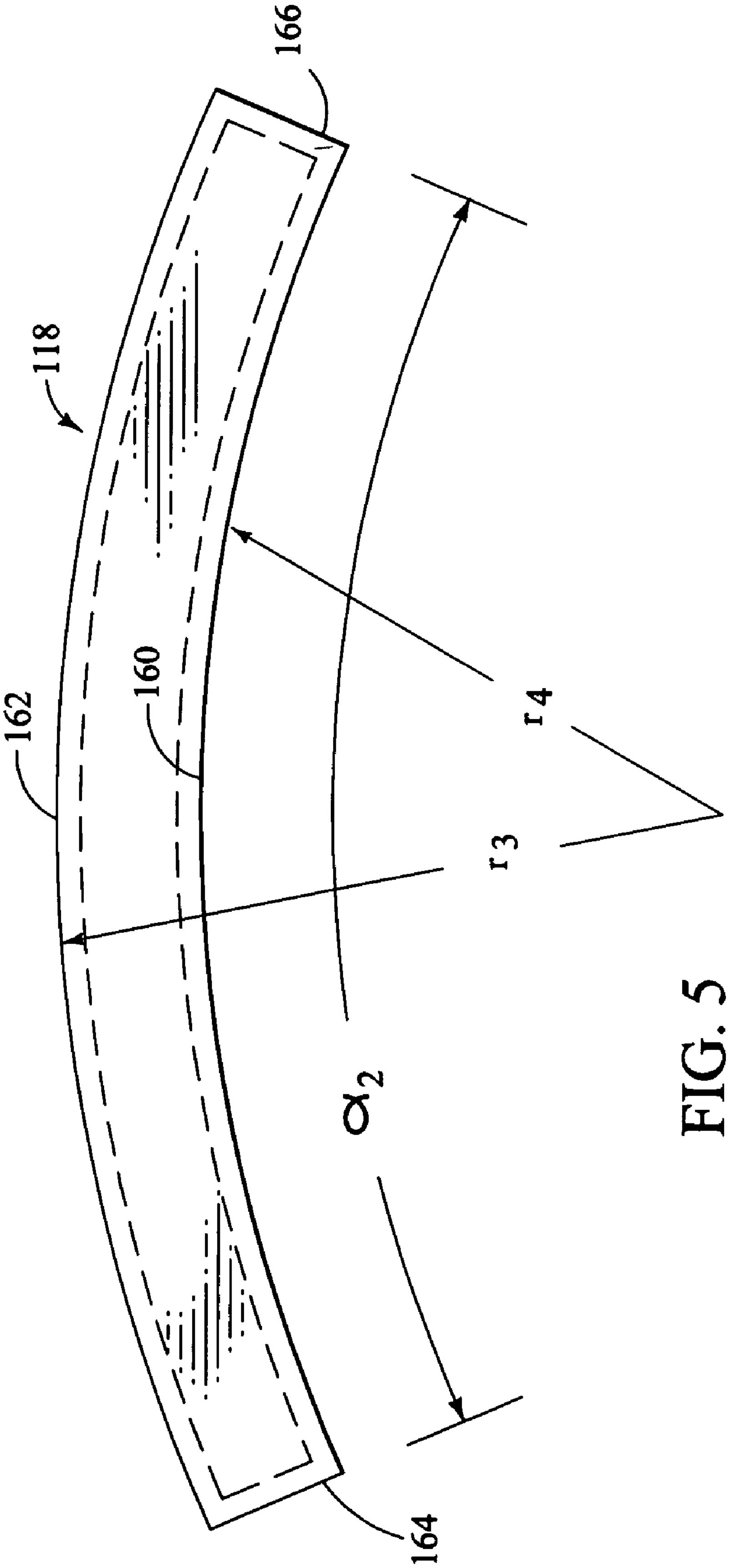
Figure 6:
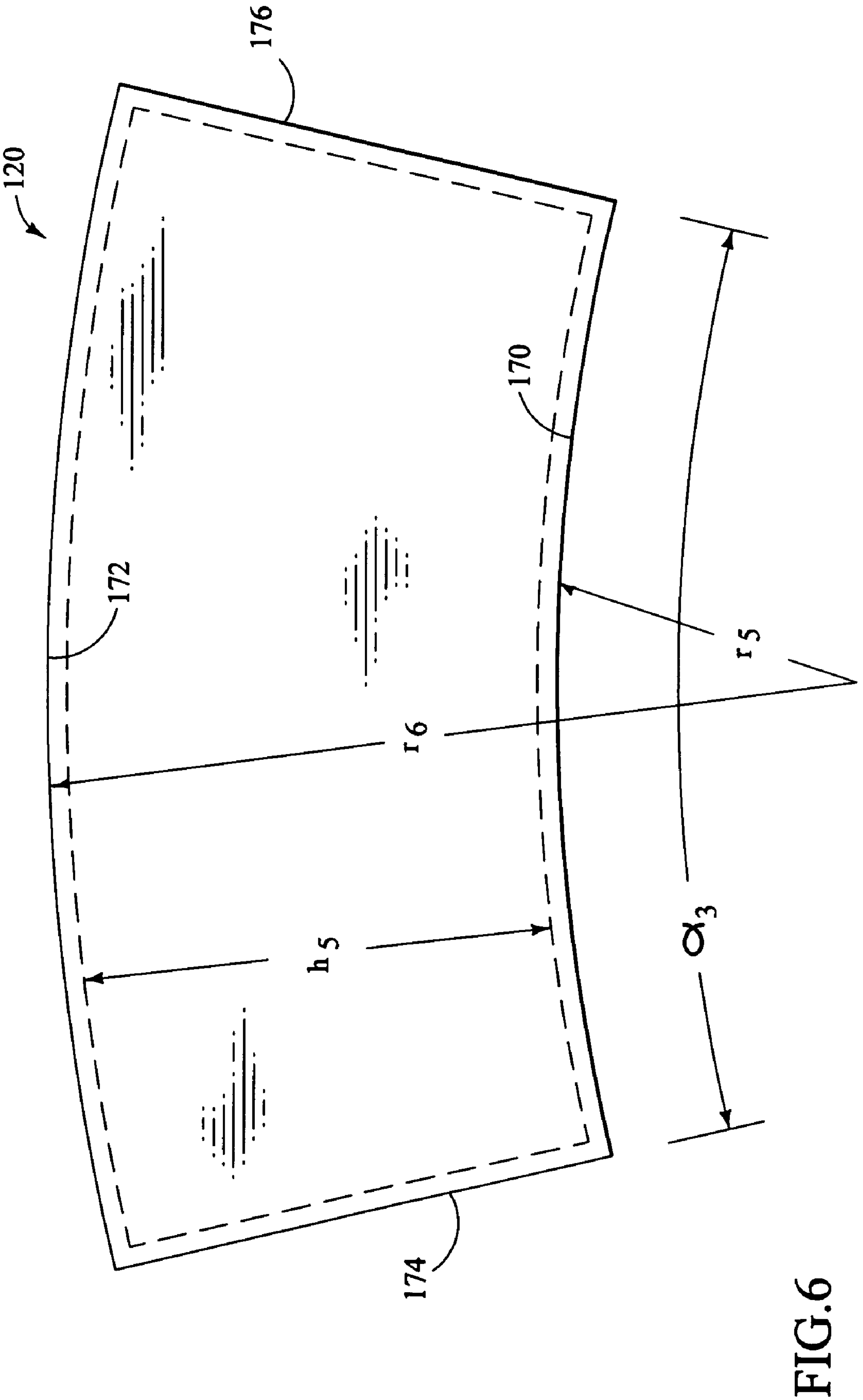

The panels illustrated in FIGS. 4-9 are quarter panels. In FIG. 4, front section 16 is comprised of four panels 116. In FIG. 5, intermediate section 18 is comprised of four panels 118. Similarly, in FIGS. 6-9, body sections 20, 22, 24, and 26 are comprised of four panels 120, 122, 124, and 126, respectively.

In the preferred embodiment illustrated, sections 16, 18, 20, 24, and 26 are frustoconical sections. Corresponding panels 116, 118, 120, 124, and 126 are frustoconical panels. The opposing linear edges of adjacent frustoconical panels are attached together to form each frustoconical section.

Figure 9:
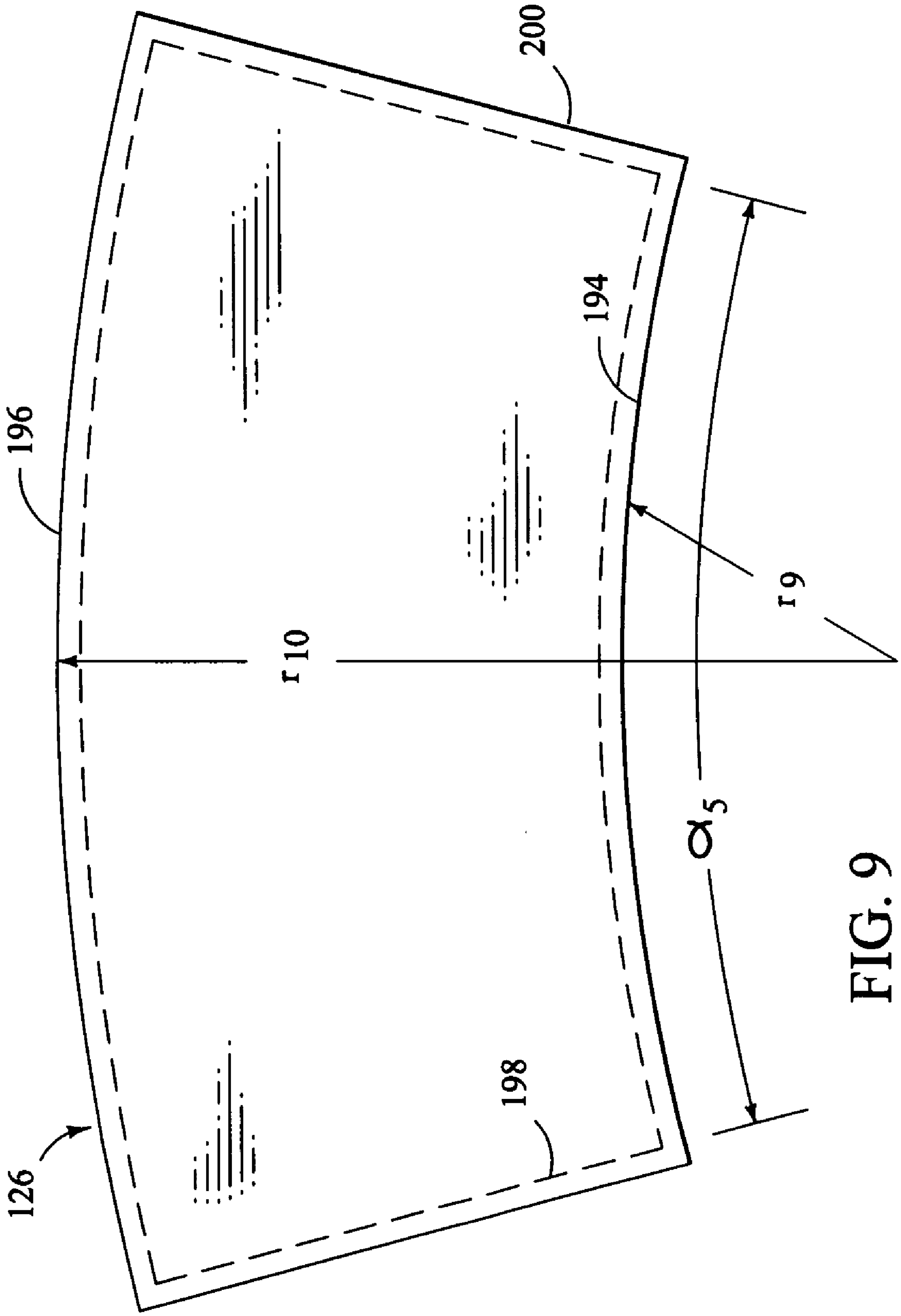

Referring to FIG. 9 as an example of this embodiment, each frustoconical panel 126 includes a large arc 196, a small arc 194, and a pair of linear edges 198 and 200, angularly disposed between large arc 196 and small arc 194. Four frustoconical panels 126 are adjacently located to form frustoconical section 26. Three of four linear edge pairs 200 and 198 are attached to each other to form four panels 126 having three pairs of attached edges 200 and 198. The final pair of linear edges 198 and 200 remains unattached to form seam 28.

The same geometric relationship is illustrated for frustoconical panels 116, 118, 120, and 124 in each of FIGS. 4-6 and FIG. 8, respectively.

Figure 10:
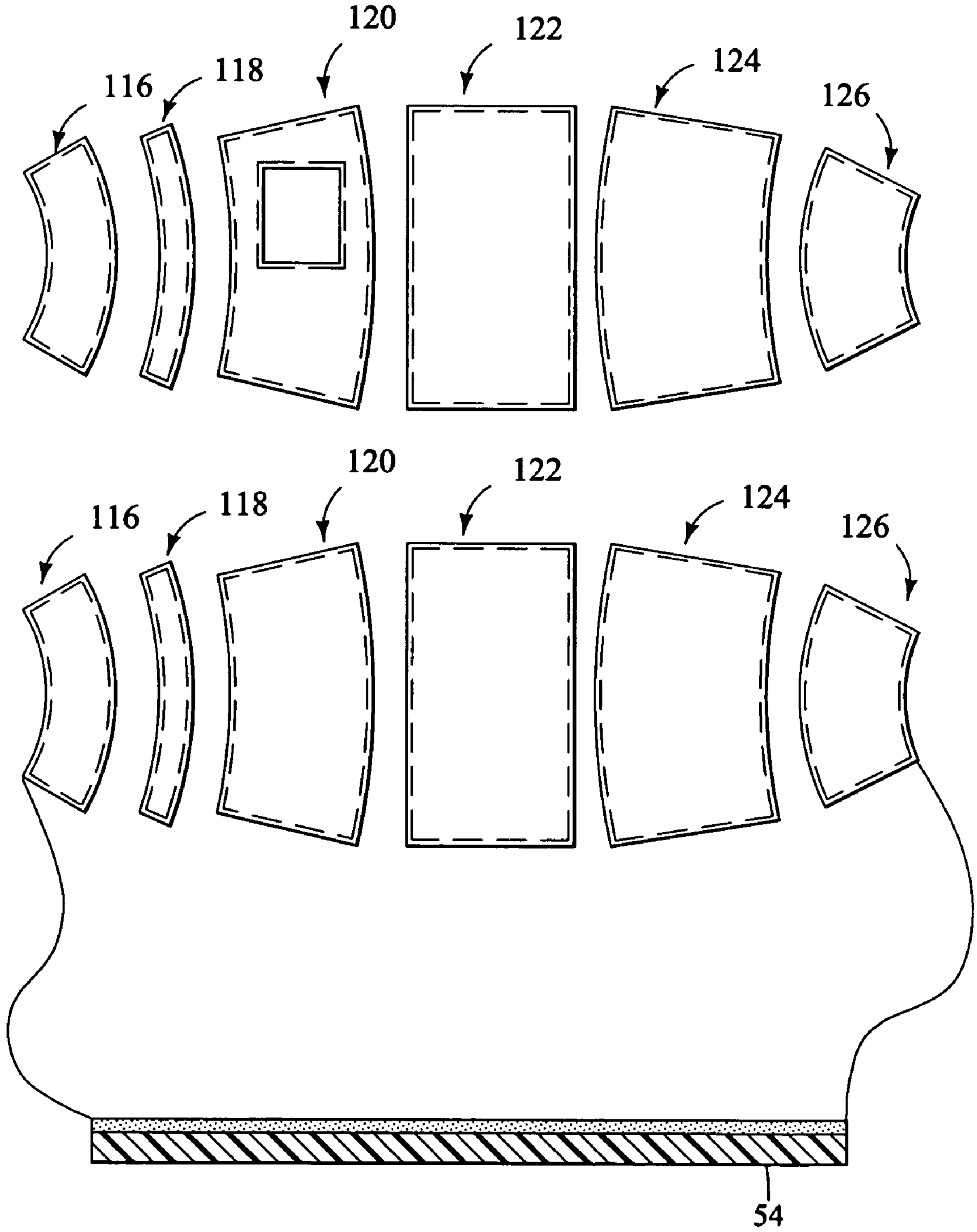
FIGS. 10 and 11 are top views of the insulator laid out in quarter panels before assembly.
Figure 11:
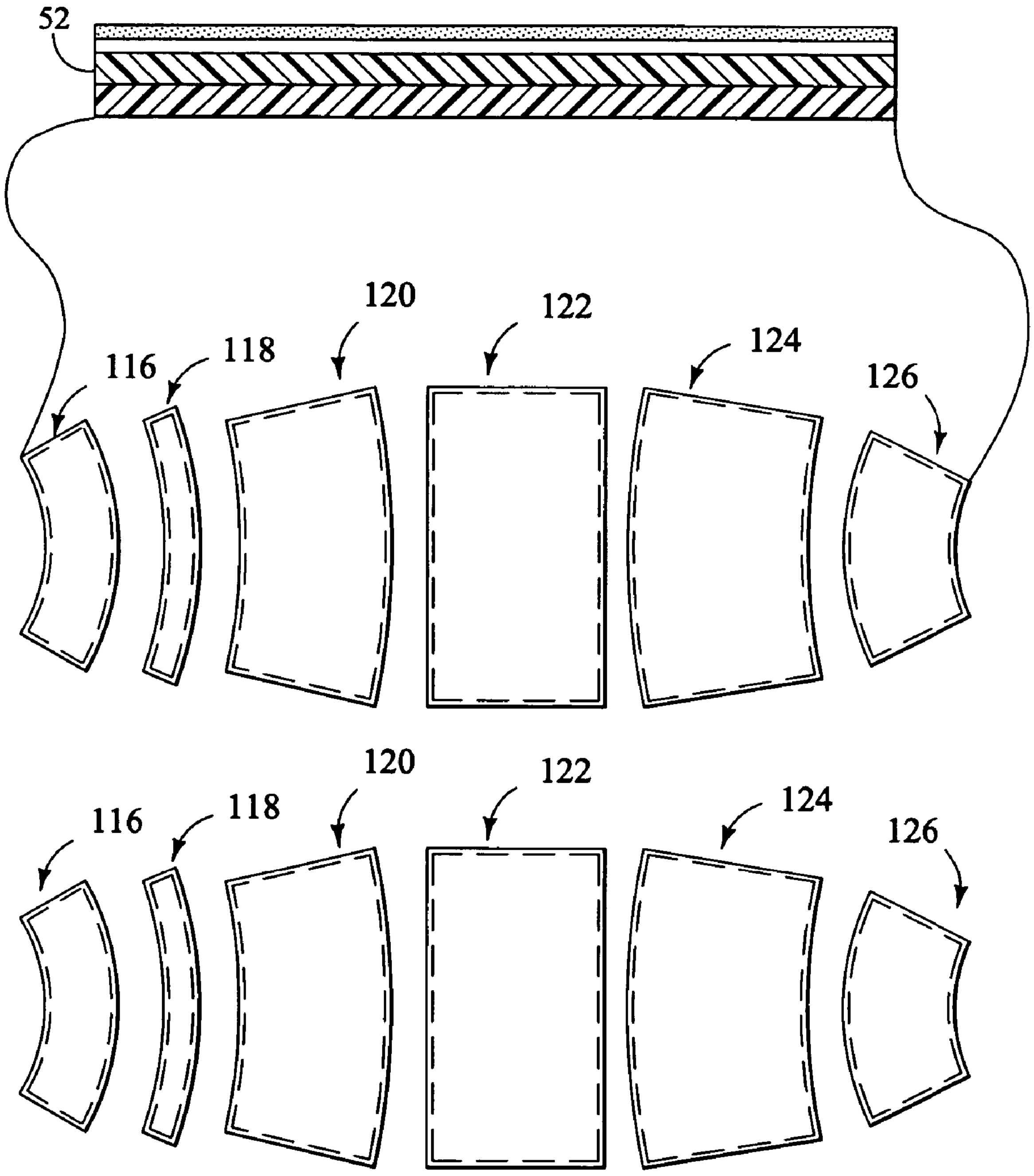

As best seen in FIG. 10, the large arc of each frustoconical panel is typically connected to the small arc of the adjacent panel. For example, as best seen in FIGS. 4, 5 and 10, large arcs 154 of frustoconical panels 116 of frustoconical section 16 are connected to small arcs 160 of frustoconical panels 118 of adjacent frustoconical section 18.

Figure 7:
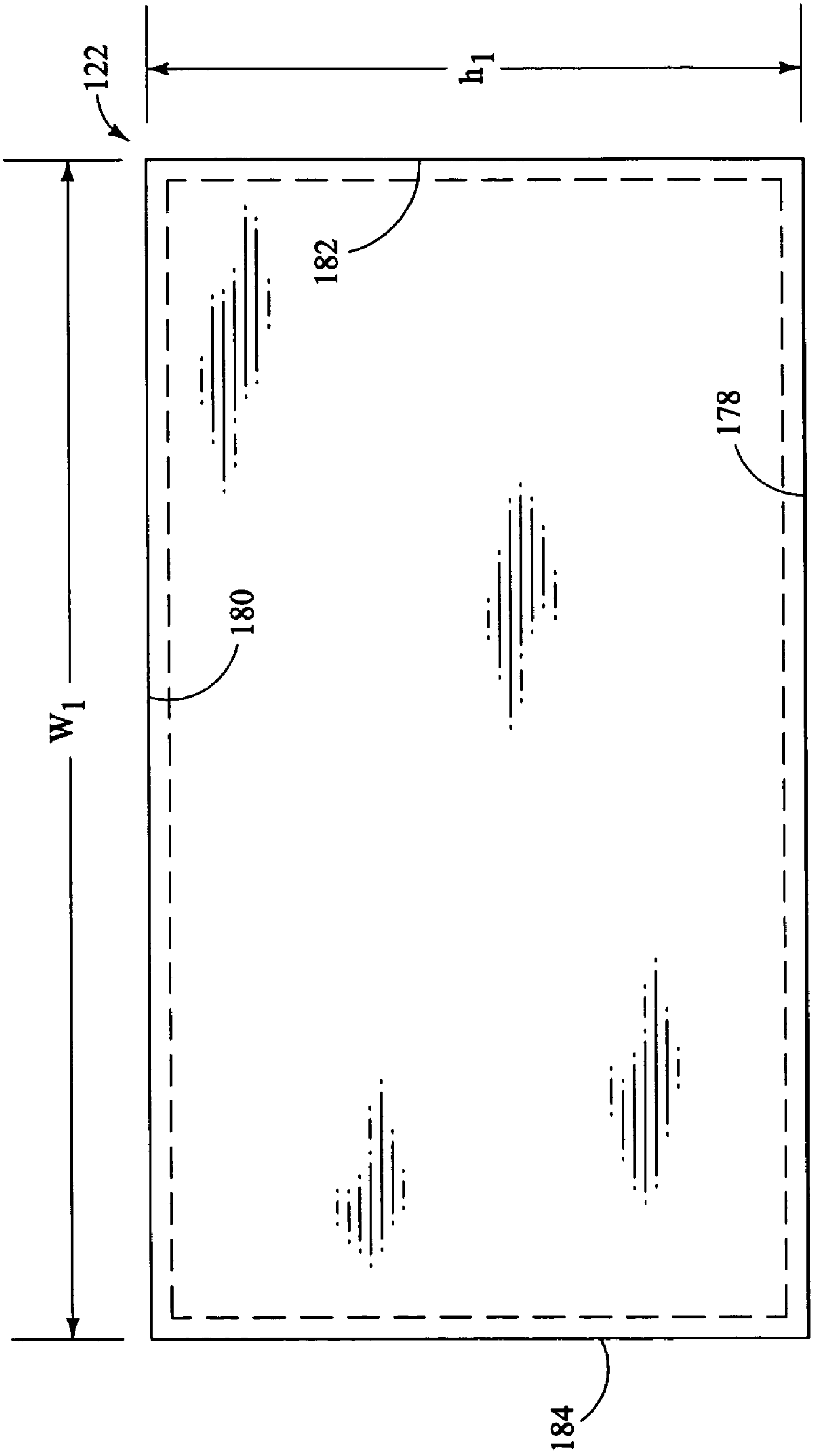
Figure 8:
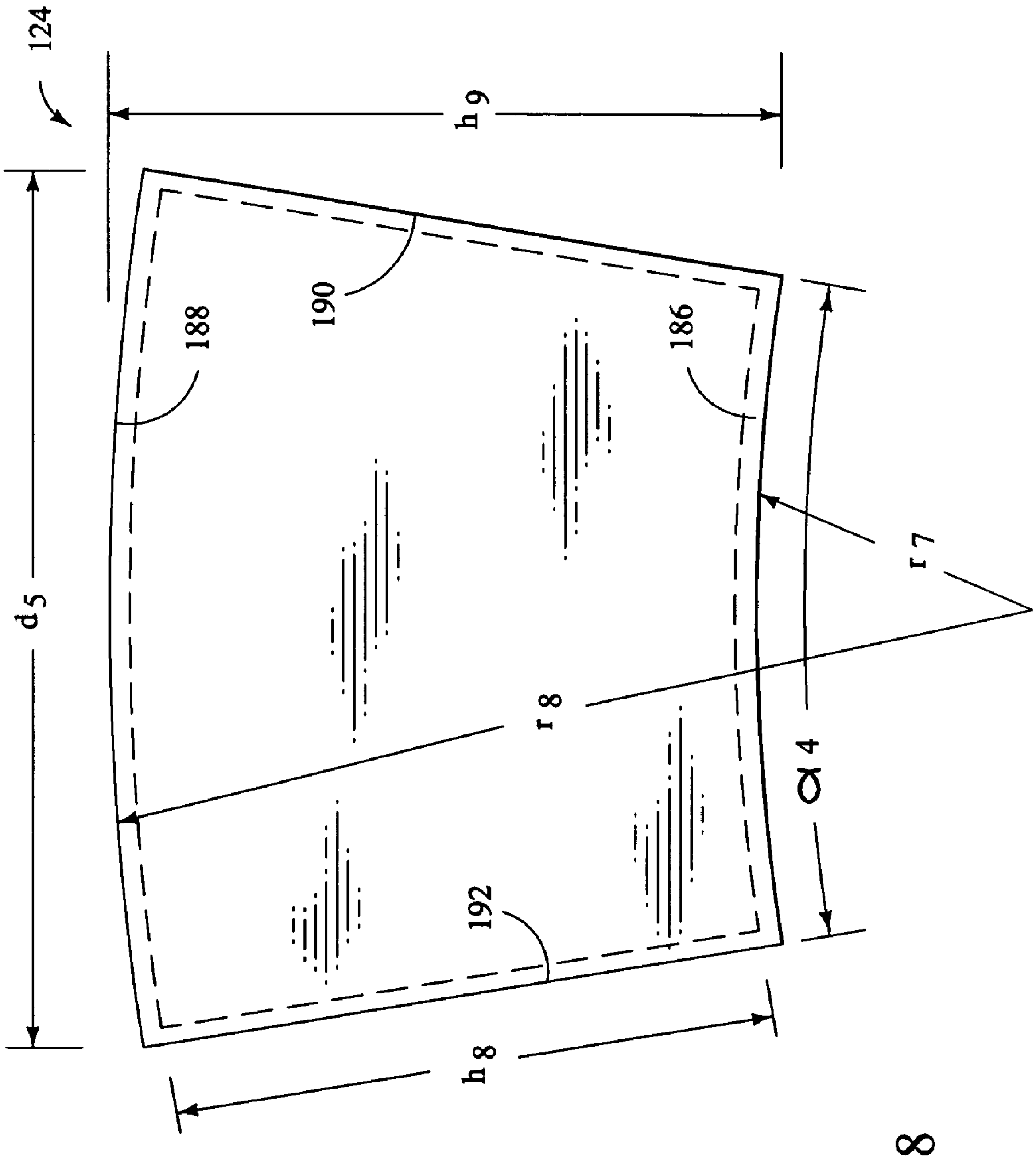

In the embodiment illustrated, insulator 14 may also optionally include a cylindrical section. Section 22 is a cylindrical section located between frustoconical sections 20 and 24. Cylindrical section 22 is comprised of four complementary rectangular panels 122. Referring to FIG. 7, rectangular panels 122 have a pair of radial widths 178 and 180, and a pair of linear edges 182 and 184.

Four cylindrical panels 122 are adjacently located to form cylindrical section 22. Three of four linear edge pairs 184 and 182 are attached to each other to form four panels 122 having three pairs of attached edges 184 and 182. The final pair of linear edges 184 and 182 remains unattached to form seam 28.

Each cylindrical panel 122 is located between a pair of frustoconical panels 120 and 124. Large arcs 172 and 188 of frustoconical panels 120 and 126 are attached to radial widths 178 and 180, respectively, of cylindrical panels 122.

Figure 13:
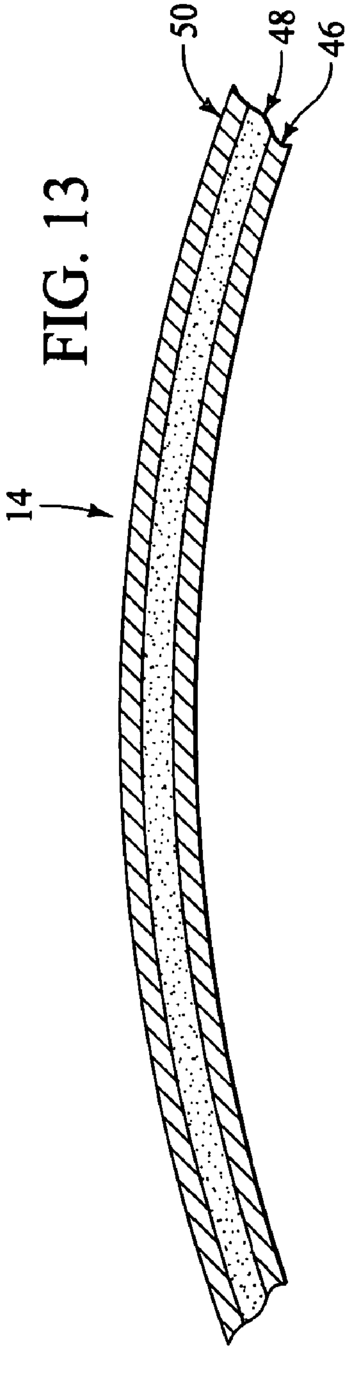
FIG. 13 is a cross-sectional breakout view of the insulation layers of the insulator in accordance with an embodiment of the present invention.

As can best be seen in FIG. 13, a cross-sectional view of the insulation layers of the insulator 14 is depicted. Insulator 14 comprises an inner layer 46, which is designed to rest adjacent to a drum 12. Coupled to inner layer 46 is an insulation layer 48, and coupled to insulation layer 48 is an outer layer 50, where outer layer 50 is exposed to the external environment.

In the preferred embodiment, inner layer 46 is a poly vinyl chloride coated woven polyester. In the more preferred embodiment, the material weight is approximately 18 ounces per square yard. In the preferred embodiment, inner layer 46 has physical properties near to, or superior to, those provided in Table 1 below:

TABLE 1

| Mechanical Properties | Results | Fed. Std. 191A | ASTM |
|---|---|---|---|
| Grab Tensile (warp) | 410 lbs. | 5100 | D5034 |
| Grab Tensile (fill) | 400 lbs. | | |
| Strip Tensile (warp 1") | 300 lbs. | 5102 | D5035 |
| Strip Tensile (fill 1") | 290 lbs | | |
| Tongue Tear (warp) | 100 lbs | 5134 | D751 |
| Tongue Tear (fill) | 90 lbs | | |
| Abrasion (Taber) wheel H-18 load 1,000 gr. 1,000 cycle, 70 rpm | 0.045 gr | 5106 | D3884 |

Materials providing properties of the preferred embodiment of inner layer 46 are commercially available, such as Polymar Tarp, Style No. VCP-18NL, from Mehler Coated Fabrics, Inc., 175 Mehler Lane, Martinsville, Va., 24112.

In the preferred embodiment, outer layer 50 is also a poly vinyl chloride coated woven polyester. In the more preferred embodiment, the material weight is approximately 22 ounces per square yard. In the preferred embodiment, outer layer 50 has physical properties near to, or superior to, those provided in Table 2 below:

TABLE 2

| Mechanical Properties | Results | Fed. Std. 191A | ASTM |
|---|---|---|---|
| Grab Tensile (warp) | 430 lbs. | 5100 | D5034 |
| Grab Tensile (fill) | 410 lbs. | | |
| Strip Tensile (warp 1") | 320 lbs. | 5102 | D5035 |
| Strip Tensile (fill 1") | 310 lbs | | |
| Tongue Tear (warp) | 110 lbs | 5134 | D751 |
| Tongue Tear (fill) | 100 lbs | | |
| Abrasion (Taber) wheel H-18 load 1,000 gr. 1,000 cycle, 70 rpm | 0.05 gr | 5106 | D3884 |

Materials providing properties of the preferred embodiment of outer layer 50 are commercially available, such as Polymar Tarp, Style No. VCP-22VN, from Mehler Coated Fabrics, Inc., 175 Mehler Lane, Martinsville, Va., 24112.

In another preferred embodiment, it is seen that there is an economic advantage to utilizing an external layer 50 which fabric weight exceeds the fabric weight of internal layer 46. In another preferred embodiment of the present invention, advertising or promotional indicia are printed directly onto outer layer 50. Silk-screen is an effective method of printing images on outer layer 50.

Insulation layer 48 is located between inner layer 46 and outer layer 50. In the preferred embodiment, insulation layer 48 is a low-density closed-cell polyethylene foam. In another preferred embodiment, insulation layer 48 has a density of approximately 2.0 $lbs/ft^3$. In the preferred embodiment, insulation layer 48 has physical properties near to, or superior to, those provided in Table 3 below:

TABLE 3

| Mechanical Properties | ASTM D-3575 | CKJN200 |
|---|---|---|
| Density | Suffix W | 2.0 |
| Tensile Strength | Suffix T | 37 |
| Elongation % | Suffix T | 100 |
| Tear Resistance | Suffix G | 11 |
| Compressive Strength 50% Deflection | Suffix D | 14.0 |
| Thermal Stability % change (24 hours @158° F. | Suffix S | <1 |
| Water Absorption Lbs/sq ft (skived) | Suffix L | <0.07 |

Materials providing properties of the preferred embodiment of insulation layer 48 are commercially available, such as Oletex™ CKJW 200, from Armacell LLC, 7600 Oakwood Street Ext, Mebane, N.C. 27302.

Operation of the Preferred Embodiments

Referring to FIG. 1 of the drawings, the reference numeral 10 generally designates a concrete truck. Concrete truck 10 has a drum 12, which is covered with an insulator 14.

As can best be seen in FIGS. 2 and 3, insulator 14 is a uniform insulating blanket having a front section 16, an intermediate section 18, and a plurality of body sections 20, 22, 24, and 26. In the embodiment illustrated, each body section 20, 24 and 26 forms a frustoconical, particularly a conical frustoconical. Body section 22 forms a cylinder. A seam 28 traverses the length of insulator 14 terminating at opening 30 within front section 16, allowing for insulator 14 to be easily deployed or removed.

In particular, insulator 14 is designed to be a flexible and foldable blanket when not in use. The inherent flexibility allows insulator 14 to be easily installed, easily folded and stored away when not in use.

Insulator 14 is applicable to a number of drum 12 variations. FIGS. 2 and 3 each depict four body sections 20, 22, 24, and 26; however, it is possible to employ fewer sections or a greater number of sections. Each section 20, 22, 24, and 26 can conform to a drum section with distinct radii, conical tapers, and so forth, so as to assist in matching the shape of drum 12.

A particular variation is depicted in FIGS. 2-11. This depicted version illustrates a preferred embodiment of the present invention configured to fit an 11 cubic yard mixer such as is commercially available from McNeilus™, 524 County Rd. 34, East Dodge Center, Minn. 55927, USA.

Table 4 below includes dimensions which will provide a concrete truck drum insulating system for the drum described above. In this table, arcs are represented by their chord length. Sufficient material overlap is provided for sewing adjacent panels together.

TABLE 4

| Panel | Large Arc Chord Length | Small Arc Chord Length | Linear Edge Length |
|---|---|---|---|
| 116 | 4'-10⅞" | 3'-10⅝" | 1'-3 3/16" |
| 118 | 5'-0" | 4'-8¾" | 5⅞" |
| 120 | 6'-3¾" | 5'-1¼" | 2'-9 11/16" |
| 122 | 6'-4¼" | 6'-4¼" | 3'-5⅜" |
| 124 | 6'-3¾" | 4'-11" | 4'-3 5/16" |
| 126 | 4'-11" | 2'-10½" | 2'-10½" |

As described herein above, each frustoconical panel is comprised of a pair of arcs; the large arc having a radius of curvature $r_1$ and the small arc having a radius of curvature $r_2$. A central angle $\alpha$ is disposed between the liner edges. Table 5 below includes supplemental dimensions for a concrete truck drum insulating system for the example drum described above.

TABLE 5

| Panel | Large Arc | Small Arc | Central Angle $\alpha$ |
|---|---|---|---|
| 116 | 42" | 29" | 82° |
| 118 | 77" | 72 | 47° |
| 120 | 91" | 59" | 25° |
| 122 | n/a | n/a | n/a |
| 124 | 120" | 70" | 19° |
| 126 | 114" | 89" | 30° |

Front section 16 covers a closed end of drum 12, which is typically proximate the cab of the concrete. Typically, front section 16 is comprised of four quarter panels 116 sewn together in a complementary manner to form a ring that is front section 16. Within front section 16 is an opening 30 that accommodates an axle responsible for drum 12 rotation. As can be seen in FIG. 1, this front section 16 is typically curved, conforming generally to a paraboloid or spherical shape having a radius of curvature in a direction toward the azimuthal axis (Z) of drum 12.

An intermediate section 18 is then formed adjacent to front section 16. Intermediate section 18 is comprised of four intermediate quarter panels 118 sewn together to form a ring. Typically, intermediate section 18 is employed at a juncture where a change in shape occurs. The change in shape can usually be defined as a transition from the front surface of drum 12 and the main body of drum 12. As can be seen in FIG. 2, intermediate section 18 conforms to a conical, spherical, or paraboloid surface having an increasing radius relative to azimuthal axis (Z) of drum 12 in a direction away from front section 16.

Body section 20 is located adjacent to intermediate section 18. Section 20 is also employed at a junction where a change in shape occurs. Section 20 is formed of four quarter panels 120 sewn together in a complementary manner to form a ring. Typically, as can be seen in FIG. 2, section 20 conforms to a conical, spherical, or paraboloid surface having an increasing radius in a direction away from front section 16.

Body section 22 is located adjacent to section 20. Section 22, however, may also be employed at a junction where a change in shape occurs. Section 22 is formed of four quarter panels 122 sewn together in a complementary manner. In the example embodiment illustrated, section 22 is cylindrical, and quarter panels 122 are rectangular. In some situations, however, section 22 can be employed at a junction where a non-cylindrical shape occurs.

Body section 24 is located adjacent to section 22. Section 24 is typically employed at a junction where a change in shape occurs. Section 24 is formed of four quarter panels 124 sewn together in a complementary manner to form a ring. Typically, as can be seen in FIG. 2, section 24 conforms to a conical, spherical, or paraboloid surface having a decreasing radius relative to azimuthal axis (Z) of drum 14 in a direction away from front section 16.

Body section 26 is located adjacent to section 24. Section 26 is typically employed at a junction where a change in shape occurs. Section 26 is formed of four quarter panels 126 sewn together in a complementary manner to form a ring. Typically, as can be seen in FIG. 2, section 26 conforms to a conical, spherical, or paraboloid surface having a decreasing radius relative to azimuthal axis (Z) of drum 14 in a direction away from front section 16.

As can be seen in FIG. 2, a longitudinal seam 28 traverses the length of insulator 14 terminating at opening 30 at front section 16. Along seam 28, a plurality of strap connectors 32 and straps 34 are attached to secure the position of insulator 14 over drum 12. In particular, a strap assembly 32 is designed and positioned along seam 28 such that one strap assembly 32 couples to one strap 34. In this manner, a relatively uniform closing force can be applied along seam 28, allowing insulator 14 to be securely and easily installed and removed.

Figure 12:
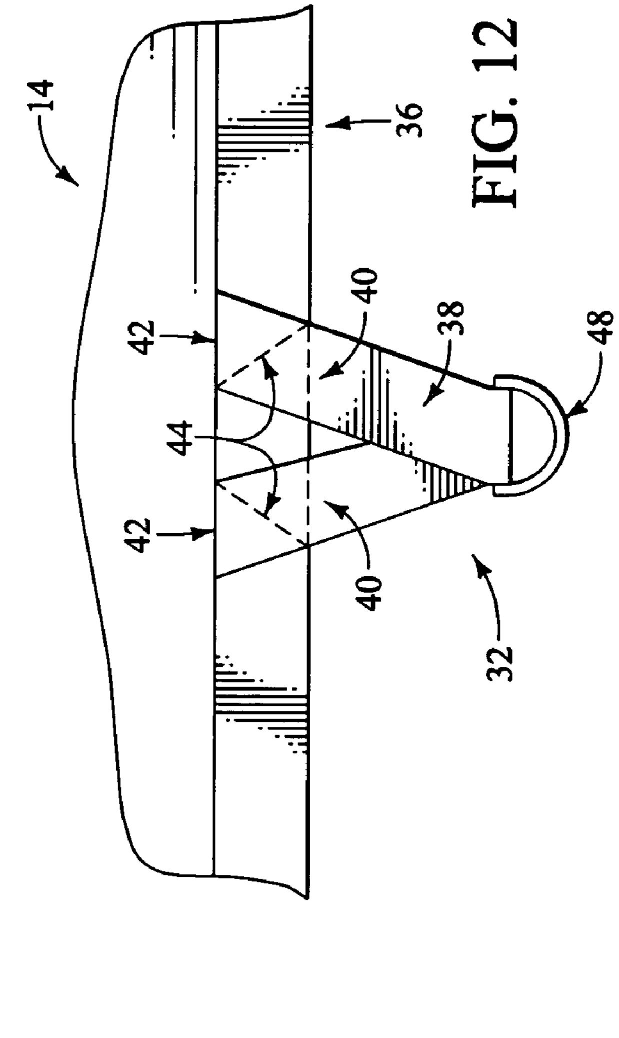
FIG. 12 is a front breakout view of a strap assembly of the insulator in accordance with a preferred embodiment of the present invention.

Referring to FIG. 12 of the drawings, the reference numeral 32 generally designates a strap assembly. Strap assembly 32 is coupled to insulator 14 at one end. In particular, a single strap 38 is employed within each strap assembly 32. Each end of strap 38 is then coupled to insulator 14. In a preferred embodiment, parallel horizontal sewing seams 40 and 42 are employed in conjunction with an interconnecting sewing seam 44 to secure each end of strap 38 to insulator 14. Therefore, strap connectors 32 are permanently affixed to insulator 14.

In one embodiment of the present invention, strap 38 is comprised of Nylon®. However, in other embodiments of the present invention, a variety of other materials can be employed.

Additionally, strap 38 secures a D-hook 48. Typically, in the preferred embodiment of the present invention, D-hooks 48 are comprised of stainless steel; however, a variety of other materials can be employed in other embodiments of the present invention. D-hook 48 is secured by strap 38 such that a straight portion of D-hook 48 is parallel to edge 36 of insulator 14. Therefore, when strap assembly 32 engages strap 34, strap 34 can be tied to D-hook 48, and tied strap 34 is able to rest in a position without encumbrances resulting from edges, as would be present with a rectangular hook. Thus, the combination of strap connectors 32 in conjunction with straps 34 allows for ease of engagement and disengagement of insulator 14.

To protect straps 34 and strap connectors 32 from the environment, longitudinal flap 52 and flap attachment 54, which traverse seam 28, are employed. The longitudinal flap 52 can, thus, provide protection to the straps 34 and strap connectors 32 from the environment and can further insulate drum 12 by reducing the area exposed to the environment. Typically, longitudinal flap 52 and flap attachment 54 are secured to one another through a hook and loop system.

However, in another preferred embodiment of the present invention, straps 34 and strap connectors 32 can be replaced with a hook and loop system.

Referring to FIG. 13 of the drawings, a cross-sectional view of the insulation layers of insulator 14 is depicted. Insulator 14 comprises an inner layer 46, an insulation layer 48, and outer layer 50.

Inner layer 46 rests immediately adjacent to drum 12 and protects insulation layer 48. Inner layer 46 provides protection against environmental conditions and wear against drum 12. Resilience to the absorption of water, chemical resistivity, and cost, were taken into account when determining the preferred material to comprise inner layer 46. Particularly, inner layer 46 must be comprised of a material that is resistant to concrete adhesion, and be durable enough to handle trucking conditions.

Outer layer 50 is coupled to insulation layer 48 to further protect insulation layer 48. Outer layer 50 protects insulation layer 48 from the external environment. Particularly, outer layer 50 can be comprised of a variety of different materials that provide protection against harsh environmental conditions, such as the presence of strong bases or strong acids, or to provide radiation protection, such as ultraviolet (UV) protection.

Other factors, such as resilience to the absorption of water, chemical resistivity, and cost, were taken into account when determining the preferred material to comprise outer layer 50. In particular, outer layer 50 is comprised of a material that is resistant to concrete adhesion to permit water washing of insulator 14. Outer layer 50 is durable enough to handle trucking conditions, such as scraping by tree branches and resistivity to contamination. Additionally, outer layer 50 provides good aerodynamic quality so as to not significantly reduce aerodynamic efficiency of concrete truck 10.

It is seen that there is an economic advantage to utilizing an external layer 50 which fabric weight exceeds the fabric weight of internal layer 46. In another preferred embodiment of the present invention, advertising or promotional indicia can be printed directly onto outer layer 50. Silk-screen is an effective method of creating images on outer layer 50.

Insulation layer 48 is located immediately adjacent to inner layer 46. In the preferred embodiment of the present invention, a durable, light-weight foam with excellent long-term insulation properties is required. The foam must be impact resistant, rot and mildew resistant, and resistant to microorganism growth. Additionally, UV and water resistance are required. The preferred embodiments of inner layer 48 closed-cell polyethylene foam meet these requirements.

A primary advantage of the present invention is that it is simple, safe, and durable. Another advantage of the present invention is that it is inexpensive to manufacture. Another advantage is that many of the fabrication difficulties associated with the assembly of insulating systems large enough to cover concrete mixers are reduced or eliminated, including handling and excessive material waste problems.

Another advantage of the present invention is that it provides for a simplified, easily deployable, and easily removable system. Other advantages of the present invention will become apparent from the above descriptions, taken in connection with the accompanying drawings, wherein, by way of illustration and example, an embodiment of the present invention is disclosed.

It will be readily apparent to those skilled in the art that the general principles defined herein may be applied to other embodiments and applications without departing from the spirit and scope of the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

We claim:

1. A concrete truck drum insulating system comprising:

a material layer for covering the drum, comprising a plurality of complementary frustoconical and cylindrical sections;

each of the sections comprised of a plurality of complementary panels;

each of the frustoconical panels including a large arc, a small arc, and a pair of linear edges between the large and small arcs;

the large arcs of the frustoconical panels of a frustoconical section connected to the small arcs of the frustoconical panels of an adjacent frustoconical section;

the cylindrical sections located between two frustoconical sections;

a longitudinal seam substantially coplanar with the azimuthal axis of the concrete drum, the seam having a first edge and complementary second edge, wherein the first and second edges are comprised of the linear edges of the frustoconical panels;

a plurality of connectable fasteners disposed along the first edge and the second edge;

a longitudinal flap located adjacent to the seam; and, a flap attachment located adjacent to the seam, removably attachable to the flap, wherein attachment of the flap to the flap attachment covers the seam and fasteners when the fasteners of the first edge are connected to the fasteners of the second edge.

2. The insulating system of claim 1, further comprising;

wherein each frustoconical panel forms one-third of the frustoconical section.

3. The insulating system of claim 1, further comprising;

wherein each frustoconical panel forms one-fourth of the frustoconical section.

4. The insulating system of claim 1, the flap further comprising:
a hook and loop system disposed between the flap and the external layer below the second edge.

5. The insulating system of claim 1, the fasteners further comprising:
straps attached to the first edge; and,
strap receptacles attached to the second edge.

6. The insulating system of claim 1, the fasteners further comprising:
straps attached to the first edge; and,
D-rings attached to the second edge.

7. The insulating system of claim 6, further comprising:
the D-rings made of a stainless steel material.

8. The insulating system of claim 1, the material layer further comprising:
an internal layer;
an external layer; and,
an insulation layer interposed between the internal and external layers.

9. The insulating system of claim 8, further comprising:
the internal layer made of a vinyl chloride coated woven polyester; and,
the external layer made of a vinyl chloride coated woven polyester having a weight greater than the weight of the internal layer.

* * * * *